US006216898B1

(12) United States Patent
Aberdein et al.

(10) Patent No.: US 6,216,898 B1
(45) Date of Patent: *Apr. 17, 2001

(54) METHOD OF MANUFACTURING A STOPPER

(75) Inventors: Christopher David Aberdein, Llandudno; Herbert Dressing, Pretoria, both of (ZA)

(73) Assignee: Portocork Internacional, S.A., Santa Maria da Feria (PT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/744,385

(22) Filed: Nov. 7, 1996

(30) Foreign Application Priority Data

Nov. 7, 1995 (ZA) ........................ 95/9423

(51) Int. Cl.⁷ .................. B05D 3/06; B65D 39/00

(52) U.S. Cl. .............. 215/355; 427/294; 427/296; 427/351; 427/387

(58) Field of Search .................. 427/294, 296, 427/351, 387; 215/355

(56) References Cited

U.S. PATENT DOCUMENTS

| 3,767,211 | * | 10/1973 | Amphlett ........................ 277/1 |
| 4,308,232 | * | 12/1981 | Crouthen et al. ............ 427/417 X |
| 4,821,900 |   | 4/1989  | Berker . |
| 5,252,685 | * | 10/1993 | Arai et al. ...................... 525/477 |

FOREIGN PATENT DOCUMENTS

| 1927397   | 12/1970 | (DE) . |
| 17 57 476 | 6/1971  | (DE) . |
| 3516633   | 11/1986 | (DE) . |
| 0 277 603 | 8/1988  | (EP) . |
| 0 546 237 | 6/1993  | (EP) . |
| 2 597 778 | 10/1987 | (FR) . |
| 1 207 674 | 10/1970 | (GB) . |

* cited by examiner

Primary Examiner—Brian K. Talbot
(74) Attorney, Agent, or Firm—Stroock & Stroock & Lavan LLP

(57) ABSTRACT

A process of manufacturing a stopper comprises impregnating a cork body with an elastomeric substance such as a silicone rubber mixture. The cork is submerged in the mixture and a vacuum is applied to enhance penetration of the mixture into the cork. The cork is then cleaned by forcing it through a conduit to remove excess liquid, and cured. A thin coating, approximately 25 μm thick, of the rubber remains on the outer surface of the cork, so that its appearance and feel are not substantially different from that of an untreated cork.

16 Claims, 1 Drawing Sheet

METHOD OF MANUFACTURING A STOPPER

BACKGROUND OF THE INVENTION

This invention relates to a method of manufacturing a stopper of the type which may be used, for example, as a cork stopper for a wine bottle.

Wine production has increased worldwide to a significant extent over the years. Traditionally wine bottles have been closed off with stoppers made from natural cork material. With the increase with wine production the demand for cork material has increased considerably. Good quality cork has increased in price considerably over the years due to the scarcity value attached to quality cork.

Various attempts have been made to overcome the shortage of quality cork material. For example, plastic stoppers and screw-cap stoppers have been developed which, in practice, operate at least as effectively as natural cork. However, there is a consumer resistance to plastic stoppers and certainly bottlers of quality wines and other beverages continue to prefer cork stoppers for their product. Another attempt to overcome the shortage of quality cork material has been to reconstitute a solid cork from comminuted lesser quality cork particles using an adhesive. Cork stoppers are then cut from the reconstituted material. These corks, however, have proved to be less than satisfactory since they often leak and tend to break up and can be difficult to extract from a bottle.

A further attempt to solve the problem of cork shortages and expense has been to coat lesser quality corks or reconstituted corks with a sealant, or to impregnate them with a silicone oil, as described in British patent no. GB 1,207,674. However, known sealants have, for one or other of the following reasons, proved to perform inadequately. Since a cork is often required to remain in situ and to provide an effective seal for a number of years, any deterioration in the sealant over time will tend to result in failure of the seal. The composition which seals the cork should also not contaminate the contents of the bottle in any way. The cost of the sealant should not be excessive and the sealant should not make insertion of the cork into the bottle or removal of the cork from the bottle too difficult. The sealant should also retain its flexibility over the intended life of the product and should not crack or break up on being removed from the bottle.

SUMMARY OF THE INVENTION

According to the invention a process of manufacturing a stopper comprises the steps of:

(a) providing a cork stopper body;
(b) immersing the stopper body in a liquid comprising an elastomeric substance;
(c) subjecting the stopper body and the liquid to a vacuum to enhance penetration of the liquid into the stopper body; and
(d) curing the impregnated stopper body, so that the stopper body is at least partially impregnated with the elastomeric substance.

Step (c) of the process may be carried out in a desiccator in which a container of the liquid, in which the stopper body is submerged, is located.

Prior to submerging the stopper body in the liquid, the liquid may be subjected to a vacuum to remove air therefrom.

The vacuum may be released and reapplied at least once.

Preferably the vacuum is sufficient to cause boiling of the liquid.

The stopper body and the liquid may be subjected to the vacuum for a period between 5 and 20 minutes.

Preferably the period is approximately 15 minutes.

The stopper body may remain submerged in the liquid for a predetermined period after the vacuum has been released.

Preferably the impregnated stopper body contains an amount of the liquid having a mass from 15% to 40% of the mass of the untreated cork.

The process may include the step of cleaning the impregnated stopper body prior to curing thereof by forcing it through a conduit to remove excess liquid from the surface thereof Preferably the conduit is a plastics tube having an internal diameter equal to or less than the diameter of the stopper body, so that the stopper body is a tight fit in the tube.

The cleaned stopper body preferably has a layer of the liquid remaining on its outer surface which has a thickness between 20 and 30 $\mu m$.

The impregnated stopper body may be cured at a temperature between 20° C. and 70° C.

The liquid may comprise a silicone rubber mixture.

BRIEF DESCRIPTION OF THE DRAWING

For a fuller understanding of the invention, reference is had to the following description taken in connection with the accompanying drawing, in which.

DETAILED DESCRIPTION OF THE PREFERRED EMBODIMENTS

Figure 1:
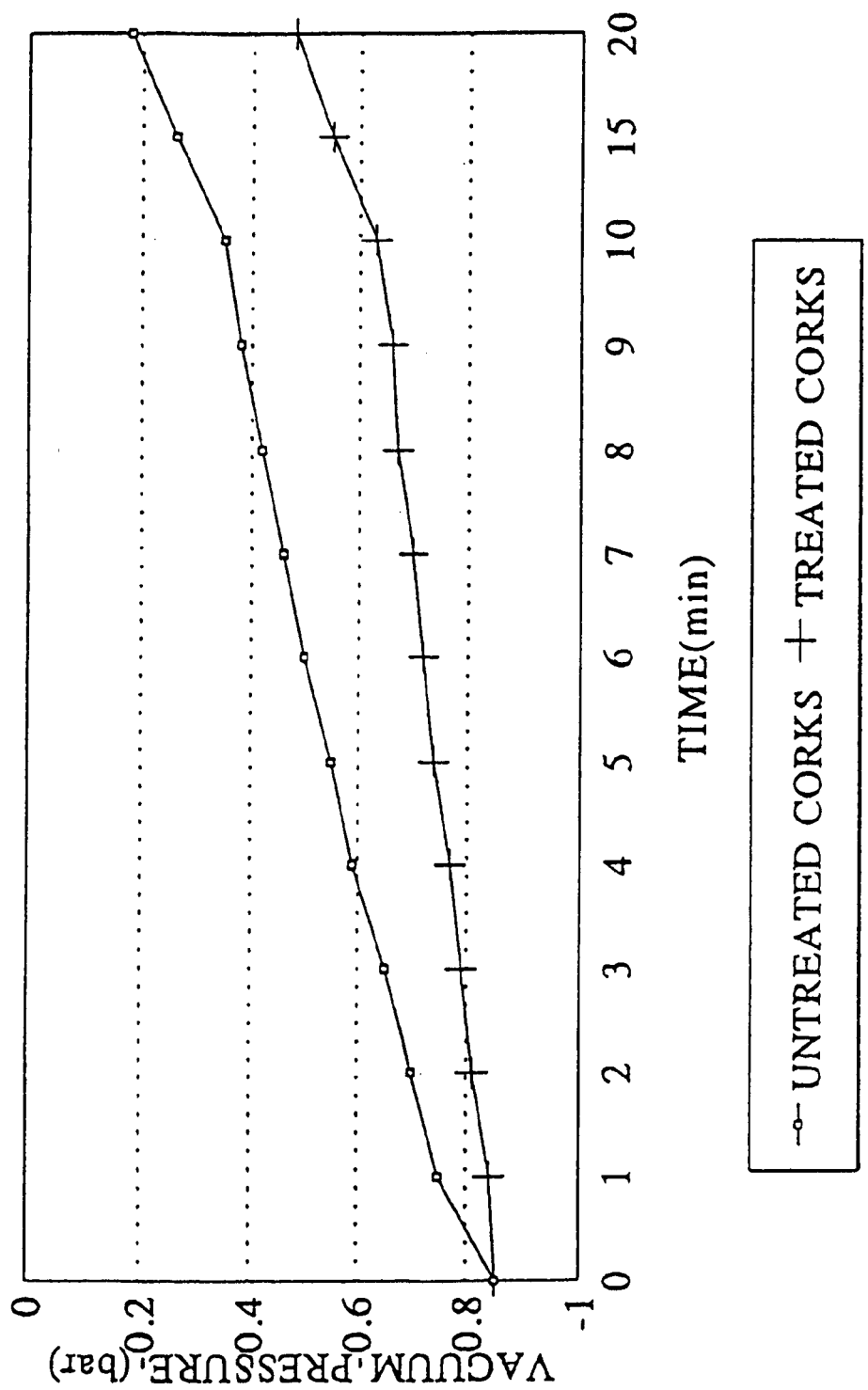
FIG. 1 is a graph comparing the performance of corks treated by the method of the invention with the performance of untreated corks.

The present invention provides a process for impregnating a conventional bottling cork with a silicone rubber or other elastomer, to improve its sealing properties.

In the prototype process, a conventional right cylindrical single-piece bottling cork was treated. Firstly, a two-part mixture of an elastomer, such as a proprietary silicone rubber product known as ELASTOSIL M4600 (trademark), manufactured by Wacker, was prepared. The mixture comprises two components A and B, which are mixed together in a ratio of approximately 10 to 1. When mixed, the components cure to form silicone rubber.

In the prototype process, 20 g of component A was mixed with 2 g of component B. Due to the relatively high viscosity of the components, mixing them causes a substantial amount of air to be trapped in the mixture. To remove the trapped air, the mixture is subjected to a vacuum.

A beaker containing the mixture was placed in a desiccator having a lid with a valve outlet, which was operated to generate the maximum possible vacuum (600 mm Hg). This caused boiling of the mixture. The vacuum was released just before the mixture could overflow. During this vacuum treatment process, numerous tiny bubbles form in the mixture, causing it to rise to the top of the container. Spilling over of the liquid is prevented by releasing the vacuum. This process was repeated a total of three times, in order to remove as much air from the mixture as possible.

A clean cork, (which can be cleaned by the methods described in British patent no. GB 1,207,674, for example) was weighed and its porosity noted. The cork was then submerged completely in the silicone mixture in the beaker and was held under the surface of the mixture by a metal weight. The beaker was then returned to the desiccator.

A vacuum of approximately 600 mm Hg was then applied by the desiccator. The period for which the vacuum was applied was varied, using different corks, between 5 and 20 minutes. A period of about 15 minutes was found to give good results. The vacuum was then released, with the cork being left in the mixture for an additional 5 minutes, to allow maximum absorption of the mixture by the cork body. Under these conditions, the silicone mixture penetrates substantially to the core of the cork. Depending on the original porosity and quality of the cork, the mass increase of the cork, due to the impregnation thereof with the silicone mixture, was found to be between 15% and 40%.

The cork was then removed from the mixture and cleaned, before being cured. To clean the impregnated corks, they were placed in a large funnel having its mouth inserted into one end of a flexible plastics tube with an internal diameter the same as or slightly less than that of the corks so that they are a tight fit in the tube. The corks are forced into the tube one by one, by a piston plunger. At the neck of the plastics tube, a bezeled guide collects and deflects excess silicone. Once the corks have been forced through and out of the plastic tube, a layer of silicone rubber remains on the outer surface of the cork, having a thickness between 20 and 30 $\mu$m, and typically 26 $\mu$m.

Different curing procedures were tested, ranging from overnight curing at room temperature (20° C.) to curing for 20 minutes at 70° C. Room temperature curing was found to avoid the formation of air bubbles at the pores of the cork.

Visual inspection under a magnifying glass showed that the silicone mixture had penetrated into the pores of the cork. However, the silicone mixture is transparent and does not change the appearance of the cork.

In order to test the performance of the treated corks, they were fitted into the neck of a steel container having a shape identical to a conventional 750 ml glass wine bottle. A vacuum of 600 mm Hg was applied to the container and the leakage was then measured over time. Table 1 shows three sets of vacuum readings on untreated corks, while Table 2 shows three sets of readings for corks treated according to the method of the invention. It can be seen that, on average, corks treated by the method of invention maintained a substantially better seal than untreated corks. In particular, in the case of a relatively poor quality cork (set 3) treatment by the method of the invention substantially improves the sealing performance of the cork. The average leakage figures are plotted in the accompanying FIG. 1.

TABLE 1

| | Vacuum Readings on untreated corks (bar) Set No.: | | | |
|---|---|---|---|---|
| Time (min) | 1 | 2 | 3 | Average: |
| 0 | −0.85 | −0.85 | −0.85 | −0.85 |
| 1 | −0.76 | −0.76 | −0.74 | −0.75 |
| 2 | 0.73 | −0.72 | −0.64 | −0.70 |
| 3 | −0.70 | −0.69 | −0.55 | −0.65 |
| 4 | −0.66 | −0.65 | −0.45 | −0.59 |
| 5 | −0.64 | −0.62 | −0.38 | −0.55 |
| 6 | −0.60 | −0.59 | −0.30 | −0.50 |
| 7 | −0.58 | −0.58 | −0.24 | −0.46 |
| 8 | −0.55 | −0.52 | −0.19 | −0.42 |
| 9 | −0.52 | −0.48 | −0.15 | −0.38 |
| 10 | −0.49 | −0.45 | −0.10 | −0.35 |
| 15 | −0.46 | −0.32 | 0.00 | −0.26 |
| 20 | −0.35 | −0.20 | 0.00 | −0.18 |

TABLE 2

| | Vacuum readings on treated corks (bar) Set No.: | | | |
|---|---|---|---|---|
| Time (min) | 1 | 2 | 3 | Average: |
| 0 | −0.85 | −0.85 | −0.85 | −0.85 |
| 1 | −0.84 | −0.83 | −0.84 | −0.85 |
| 2 | −0.81 | −0.80 | −0.83 | −0.81 |
| 3 | −0.79 | −0.77 | −0.80 | −0.79 |
| 4 | −0.76 | −0.75 | −0.79 | −0.77 |
| 5 | −0.74 | −0.72 | −0.76 | −0.74 |
| 6 | −0.72 | −0.69 | −0.75 | −0.72 |
| 7 | −0.69 | −0.67 | −0.74 | −0.70 |
| 8 | −0.66 | −0.65 | −0.71 | −0.67 |
| 9 | −0.64 | −0.63 | −0.70 | −0.66 |
| 10 | −0.62 | −0.60 | −0.68 | −0.63 |
| 15 | −0.41 | −0.58 | −0.67 | −0.55 |
| 20 | −0.37 | −0.42 | −0.64 | −0.48 |

The treated cork can be removed from a bottle into which it is inserted using a normal corkscrew and it is not anticipated that the ease of removal of the cork will be adversely affected. In this regard, the thickness of the layer of silicone rubber on the outer surface of the cork is important. A relatively thick layer of rubber changes the look and feel of the cork, and makes it difficult to insert and remove. By contrast, corks treated by the process of the invention look and feel almost identical to untreated corks. Since the ELASTOSIL silicone material is completely inert, the treated cork does not adversely affect the contents of a bottle of wine or other beverage.

It will be noted from Tables 1 and 2 that the relatively poor quality cork (set 3), which performs worst in its untreated state, performs best after treatment. This is because it is more porous and absorbs more silicone material, bringing it closer in performance to the ideal of a solid silicone rubber plug. Effectively, the untreated cork serves as a porous body which supports the silicone rubber with its sealing properties. Thus, surprisingly, the process of the invention allows lower cost inferior corks to be converted into superior stoppers, which nevertheless appear to the user to be conventional corks.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A process of manufacturing a stopper comprising the steps of:
   (a) providing a cork stopper body;
   (b) immersing the stopper body in a liquid comprising a silicon rubber mixture
   (c) subjecting the stopper body and the liquid to a vacuum to enhance penetration of the liquid into the stopper body; and
   (d) curing the impregnated stopper body, so that the stopper body is at least partially impregnated with the elastomeric substance.

2. A method according to claim 1, wherein step (c) of the process is carried out in a desiccator in which a container of the liquid, in which the stopper body is submerged, is located.

3. A process according to claim 1, wherein, prior to submerging the stopper body in the liquid, the liquid is subjected to a vacuum to remove air therefrom.

4. A process according to claim 3, wherein the vacuum is released and reapplied at least once.

5. A process according to claim 3, wherein the vacuum is sufficient to cause boiling of the liquid.

6. A process according to claim 5, wherein the vacuum is approximately 600 mm Hg.

7. A process according to claim 1, wherein the stopper body and the liquid are subjected to the vacuum for a period between 5 and 20 minutes.

8. A process according to claim 7, wherein the period is approximately 15 minutes.

9. A process according to claim 7, wherein the stopper body remains submerged in the liquid for a predetermined period after the vacuum has been released.

10. A process according to claim 1, wherein the impregnated stopper body contains an amount of the liquid having a mass from 15% to 40% of the mass of the untreated cork.

11. A process according to claim 1, including the step of cleaning the impregnated stopper body prior to curing thereof by forcing it through a conduit to remove excess liquid from the surface thereof.

12. A process according to claim 11, wherein the conduit is a plastic tube having an internal diameter equal to or less than the diameter of the stopper body, so that the stopper body is a tight fit in the tube.

13. A process according to claim 12, wherein the cleaned stopper body has a layer of the liquid remaining on its outer surface which has a thickness between 20 and 30 $\mu$m.

14. A process according to claim 13, wherein the thickness of the layer of liquid is about 26 $\mu$m.

15. A process according to claim 1, wherein the impregnated stopper body is cured at a temperature between 20° C. and 70° C.

16. A stopper manufactured in accordance with the process of claim 1.

* * * * *